July 28, 1964  T. A. FISHER  3,142,283
UNDERWATER HULL PROTECTOR BAG
Filed Feb. 18, 1963  2 Sheets-Sheet 1
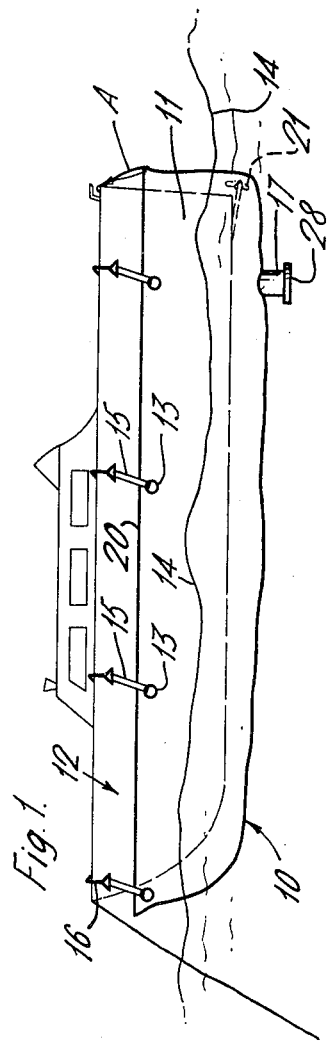
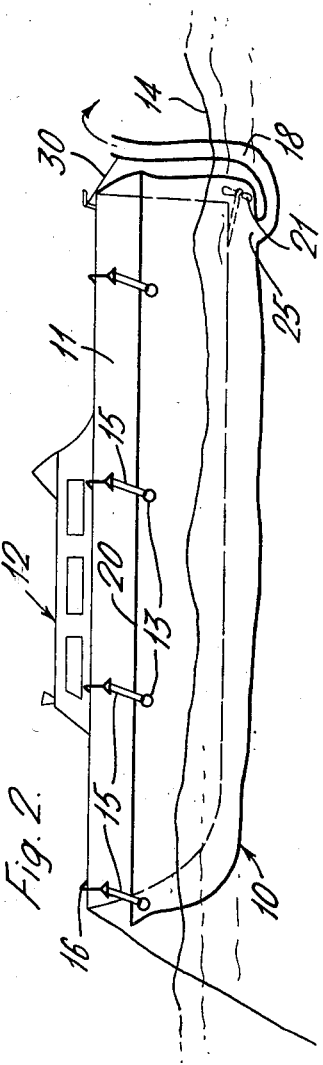
INVENTOR
THEOPHIL A. FISHER
Cushman, Darby & Cushman
ATTORNEYS July 28, 1964     T. A. FISHER     3,142,283
UNDERWATER HULL PROTECTOR BAG
Filed Feb. 18, 1963     2 Sheets-Sheet 2
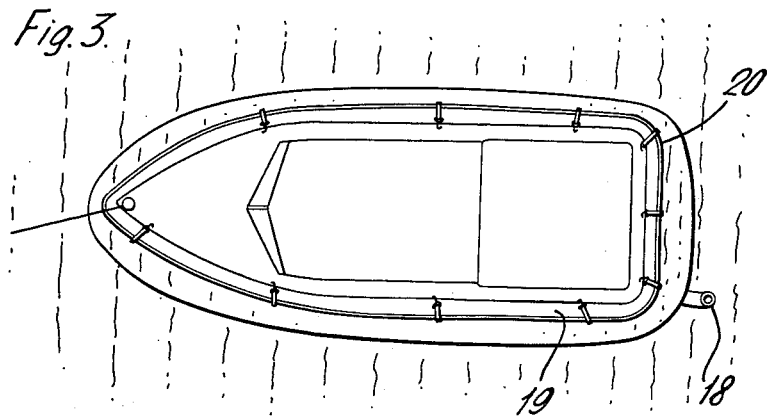
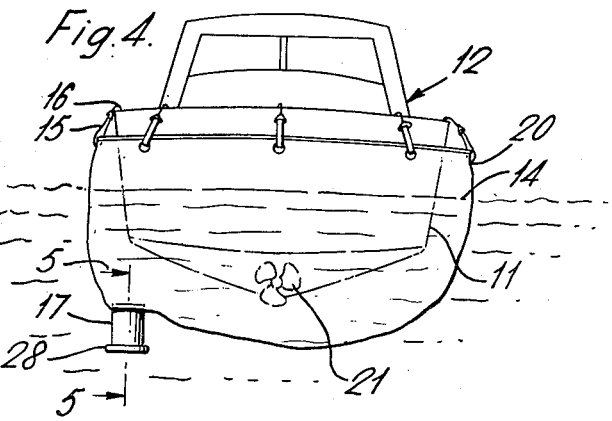
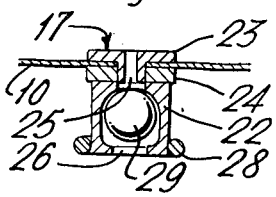 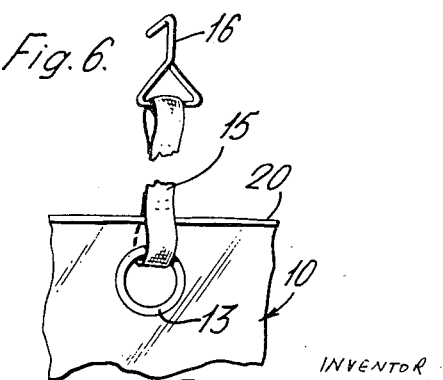
INVENTOR
THEOPHIL A. FISHER
Cushman, Darby & Cushman
ATTORNEYS

United States Patent Office

3,142,283
Patented July 28, 1964

3,142,283
UNDERWATER HULL PROTECTOR BAG
Theophil A. Fisher, 413 Davie St., Vancouver,
British Columbia, Canada
Filed Feb. 18, 1963, Ser. No. 259,317
Claims priority, application Canada Nov. 21, 1962
1 Claim. (Cl. 114—222)

This invention relates to protective devices for submerged bodies and more particularly to a flexible waterproof sheath or bag, and to a method, for protecting a hull of a water craft from marine growths and electrolysis while the craft is moored in sea water.

When water craft are moored in salt water for any length of time, it is necessary to protect the hulls from marine growths, in the case of wood or fiberglass hulls, and from electrolysis, in the case of steel hulls. A further danger is that the craft may spring a leak, and if left unattended, will either take on water, which will damage the interior of the craft, or, in more extreme cases, the craft will sink.

It is the purpose of this invention to provide a hull protective device which is inexpensive to manufacture, easy to install and compact and easily stored when not in use.

The present invention provides, in one of its aspects, a flexible one-piece sheath for covering the lower portion of a body partially submerged in water, said sheath consisting essentially of a sheet of a flexible waterproof material adapted to cover the entire submerged portion of said body, and extend above the waterline, means to secure said sheath to said body, and outlet means at the lower portion of said sheath. In another of its aspects the present invention provides a method of protecting a body partially submerged in sea water from marine growth and electrolysis comprising the steps of: securing a waterproof sheath having outlet means at the lower portion thereof around the submerged portion of said body to exclude said sea water, some of said sea water being retained in said sheath; isolating said sea water within said sheath from the sea water external to said sheath; treating said sea water within said sheath to reduce its tendency to induce marine growths and electrolysis; and preventing fresh sea water from entering said sheath through said outlet means.

In the drawings which illustrate embodiments of the invention;

FIG. 1 is a side elevational view of the hull protector sheath of this invention including a valve in position on a water craft;

FIG. 2 is a side elevational view similar to FIG. 1 showing a sheath equipped with a conduit;

FIG. 3 is a top plan view of the sheath of FIG. 2;

FIG. 4 is an end view of the water craft and attached sheath of FIG. 1;

FIG. 5 is a sectional view of the valve taken along the line 5—5 of FIG. 4, and

FIG. 6 is a perspective view of a portion of the sheath showing a means for securing the sheath to the craft.

Referring by numerals to the accompanying drawings, the invention comprises in general a sheath or bag 10 of flexible waterproof material, as shown in FIGS. 1 and 2 covering the lower portion of a hull 11 of a water craft 12. The sheath 10 is provided with attached elastic members 15 to which hooks 16 are attached to secure the upper edge of the sheath to the deck of the craft 12. A one-way valve 17 may be provided in the lower portion of the bag 10 or, if desired a conduit 18 may be provided, as illustrated in FIG. 2.

The embodiments shown are of transparent plastic material, although other flexible waterproof materials may be used.

The sheath 10 comprises sheets of plastic, rubberized fabric, or the like, integrally joined by welding, adhesives, or other suitable means, to form a bag having an open top 19, and a rim or upper edge 20. If desired, the sheath may be made substantially the same shape as the hull of the craft to be protected. The sheath 10, however, must be somewhat larger than the hull, particularly at the stern of the craft where damage would be caused by protruding propeller blades 21, or the like, if the sheath 10 is in intimate contact with the hull 11. The sheath or bag 10 must have sufficient depth to extend above the waterline 14 of the craft, and allow for a certain amount of turbulence in the water without allowing waves to wash over the upper edge 20 of the sheath 10.

Eyelets 13 are provided at spaced intervals around the sheath 10, adjacent the upper edge 20 (FIG. 6). Elastic members 15 are secured through each of the eyelets 13. Rigid wire hooks 16 attached to the other end of each flexible member 15 engage the rail or deck of the craft to maintain the sheath 10 in position. The elastic members 15 may comprise rubber bands, helical or coil springs, or the like.

The lower portion of the sheath 10 in FIG. 1 is provided with a one-way check valve 17, shown more clearly in FIG. 5. The valve 17 is of conventional construction, and includes a hollow cylindrical housing 22, detachable outer ring 23 which is adapted to co-operate with attached ring 24 to clamp the valve 17 at the periphery of an aperture 25 in the sheath 10. An aperture 26 in the housing communicates with the interior of the sheath 10, and a hollow ball 29 retained in the housing 22 is adapted to close the aperture 25 to prevent fluid from entering the sheath 10. The valve 17 may be constructed entirely of molded plastic material, in which case a ring 28 of a nonbuoyant material, such as lead, is secured to the valve 17 to prevent it from turning upside down, due to flotation and thereby becoming inoperative. If the sheath 10, to which the valve 17 is secured, becomes damaged, the valve 17 can be detached and used on another sheath.

When a craft 12 is to be moored in sea water for a week or more, a sheath 10 as illustrated in FIGS. 1 and 4, is slipped around the lower portion of the hull 11, and secured at deck level by the elastic members 15 and their associated hooks 16. As a slight pressure is exerted on the upper portions of the sheath or bag 10 bringing the upper edge 20 thereof closer to the hull 11, salt water in the bag is forced out the one-way check valve 17. Fresh water can then be introduced into the bag 10 through a hose (not shown) inserted between the bag 10 and the hull 11. Any salt water remaining in the bag will thus tend to be expelled at the check valve 17, as the salt water, due to its greater density, will tend to remain at the lower portion of the bag. In any event, the salt water will be diluted to an extent which will discourage the formation of marine growth on the hull 11. In cases where fresh water is not readily available, a chemical inhibitor can be added to the salt water remaining in the bag 10.

In the case of a leak developing in the hull, the water in the bag can be removed and the pressure of the surrounding body of water will press the sheath 10 tightly against the hull, thereby sealing the leak.

I claim:

A flexible one-piece sheath of plastic film for covering the lower portion of a body partially submerged in water, to separate water trapped within said sheath from the surrounding body of water, said trapped water having been treated to protect said body from marine growths and electrolysis, said sheath consisting essentially of: a thin sheet of flexible waterproof plastic adapted to cover the entire submerged portion of said body and to extend above the water line; a plurality of hooks, each of said hooks being secured to said sheath by an elongated elastically extensible member, said hooks and said extensible members being adapted resiliently to secure said sheath to said body to prevent rupturing of said sheath due to turbulence of the surrounding body of water; and a conduit on a lower portion of said sheath provided with valve means adapted to prevent fluid from entering said sheath and to allow liquid to escape from said sheath when said sheath is drawn around said hull and when additional liquid is introduced into said sheath to thereby prevent rupturing of said sheath.

References Cited in the file of this patent

UNITED STATES PATENTS

| | | |
|---|---|---|
| 632,919 | Farley | Sept. 12, 1899 |
| 953,881 | Winand | Apr. 5, 1910 |
| 1,070,260 | Jameson | Aug. 12, 1913 |
| 1,240,189 | Fornaca | Sept. 18, 1917 |
| 1,973,813 | Kelley | Sept. 18, 1934 |
| 2,772,648 | De Persia | Dec. 4, 1956 |
| 2,878,013 | Piodi | Mar. 17, 1959 |
| 2,892,434 | Ralleo | June 30, 1959 |
| 2,919,670 | Clark | Jan. 5, 1960 |